2 Sheets--Sheet 1.

A. T. NICHOLS.
Edging-Machines.

No. 148,490. Patented March 10, 1874.

WITNESSES.

INVENTOR

2 Sheets--Sheet 2.

A. T. NICHOLS.
Edging-Machines.

No. 148,490. Patented March 10, 1874.

WITNESSES.
Franck L. Ourand
C. L. Ewert

INVENTOR
Albert T. Nichols

By Alexander & Mason
Attorneys.

UNITED STATES PATENT OFFICE.

ALBERT T. NICHOLS, OF WILLIAMSPORT, PENNSYLVANIA.

IMPROVEMENT IN EDGING-MACHINES.

Specification forming part of Letters Patent No. 148,490, dated March 10, 1874; application filed February 26, 1874.

*To all whom it may concern:*

Be it known that I, ALBERT T. NICHOLS, of Williamsport, in the county of Lycoming and in the State of Pennsylvania, have invented certain new and useful Improvements in Edging-Machines; and do hereby declare that the following is a full, clear, and exact description thereof, reference being had to the accompanying drawings, and to the letters of reference marked thereon, making a part of this specification.

My invention is particularly designed for use upon the class of sawing-machines known as double-edgers and ripping-machines or bench-saws; and the nature of my invention consists in the devices for moving the adjustable gage on the feed-table and the adjustable saw or saws on the saw-arbor, as will be hereinafter more fully set forth.

In order to enable others skilled in the art to which my invention appertains to make and use the same, I will now proceed to describe its construction and operation, referring to the annexed drawings, in which—

Figure 1:
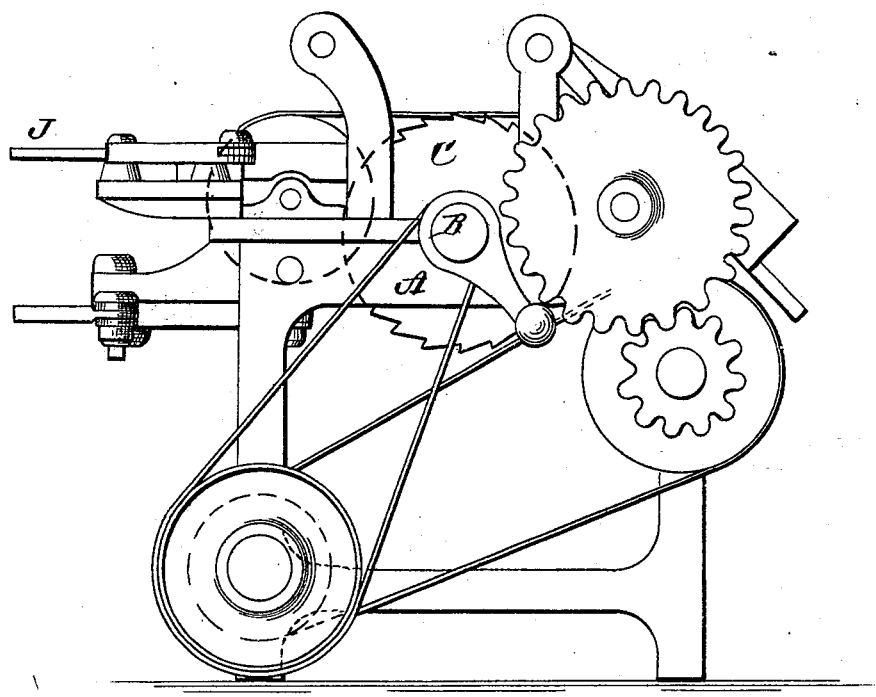
Figure 2:
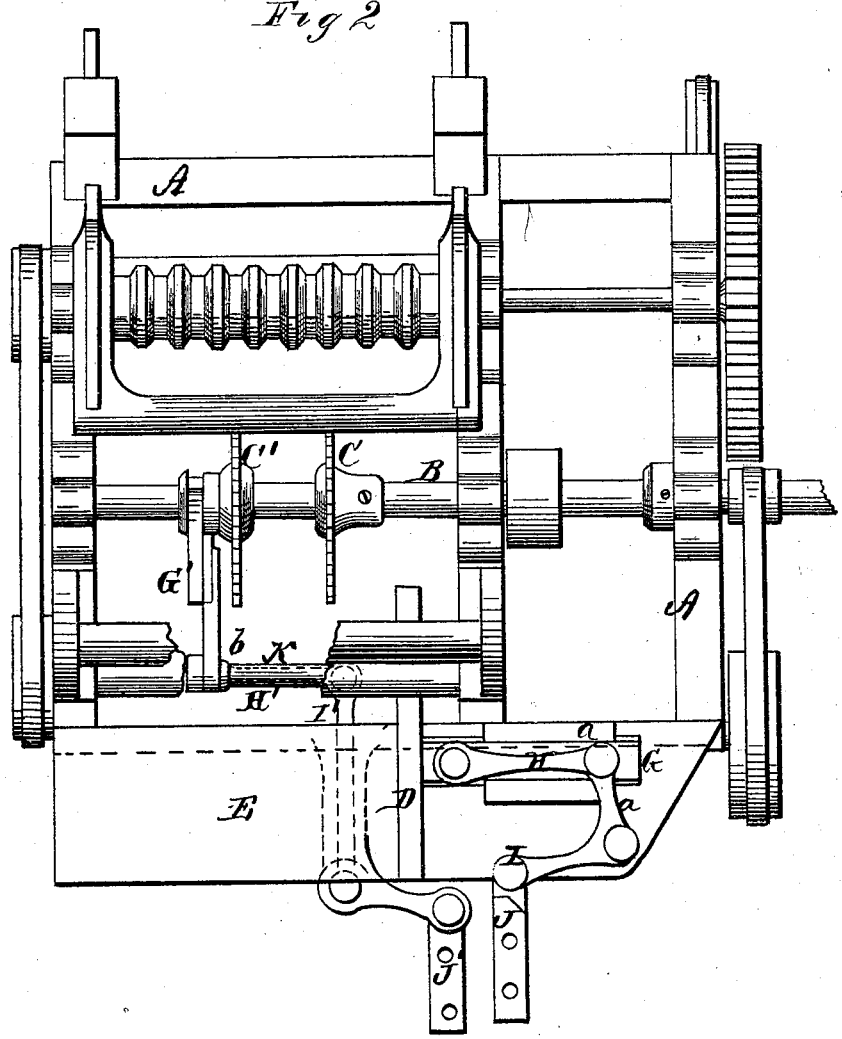

Figure 1 is a side elevation, and Fig. 2 a plan view, of a sawing-machine embodying my invention.

A represents the frame of the machine. B is the saw-arbor, with one stationary saw, C, and one or more movable saws, C'. E is the feed-table, upon which is the laterally-moving guide or gage D. This guide is attached to a horizontal bar, G, extending from it at right angles, and placed between guides $a$ $a$ on the feed-table E. On top of the bar G, near the guide D, is pivoted a lever, H, which extends along the bar G, the other end of said lever being pivoted to one end of an elbow-lever, I. This elbow-lever is pivoted at its angle to the feed-table, and its other arm is about of the same length as the lever H, and extends toward the guide D. To this end of the elbow-lever I is pivoted an arm, J, which extends straight outward from the machine, and is operated by means of a suitable lever, so that, by pulling outward or pushing in said arm J, the gage or guide D will be moved in or out, as required. The hub of each saw C' is grooved circumferentially, and in said groove is placed the forked end of an arm, G', the other end of which is formed with a suitable hub, $b$, and placed on a counter-shaft, K. To the hub $b$ is pivoted one end of a lever, H', the other end of which is pivoted to one end of an elbow-lever, I'. This elbow-lever is at its angle pivoted to an arm or bar on the frame of the machine, and to the other end is pivoted an arm, J', to be operated by a suitable lever.

It is of great importance, in the class of machines to which my invention appertains, to move the saws at accurate distances on the arbor and hold them firmly in place after being so moved, so as to saw the lumber straight and prevent the saws from becoming too quickly heated.

I am aware that a vertical lever connected to a short horizontal lever, which is connected to the saws for moving the saws on the arbor, is not new. With my arrangement of devices the levers are horizontally arranged, and the main long operating bar or lever causes the saws to be moved back and forth by pushing and pulling on said lever. By this means there is no spring to any of the levers; hence the saws are caused to move just at the points desired, and, when moved, are rigidly held in place.

With a vertical lever there is always more or less spring; hence the saws cannot be controlled as I control them.

By these means the guide D and saw C' can be easily adjusted to the desired points. Other saws upon the same arbor may be adjusted in precisely the same manner.

Having thus fully described my invention, what I claim as new, and desire to secure by Letters Patent, is—

1. The combination, with the movable guide or gage D, of the bar G, connection H, elbow-lever I, and arm J, all substantially as and for the purposes herein set forth.

2. The combination, with the movable saw C', of the bar G', with hub $b$ sliding upon the counter-shaft K, the connection H', elbow-lever I', and arm J', all substantially as and for the purposes herein set forth.

In testimony that I claim the foregoing I have hereunto set my hand this 21st day of February, 1874.

ALBERT T. NICHOLS.

Witnesses:
 A. N. MARR,
 C. L. EVERT.